United States Patent [19]

Shimoni et al.

[11] Patent Number: 4,809,350

[45] Date of Patent: Feb. 28, 1989

[54] DATA COMPRESSION SYSTEM

[75] Inventors: Yair Shimoni, Jerusalem; Ron Niv, Raanana, both of Israel

[73] Assignee: Elscint Ltd., Haifa, Israel

[21] Appl. No.: 8,768

[22] Filed: Jan. 30, 1987

[30] Foreign Application Priority Data

Feb. 10, 1986 [IL] Israel ................................. 77840

[51] Int. Cl.⁴ ............................................. G06K 9/36
[52] U.S. Cl. ...................................... 382/56; 358/133
[58] Field of Search ................... 382/56; 358/135, 136, 358/260, 262, 133

[56] References Cited

U.S. PATENT DOCUMENTS

| | | | |
|---|---|---|---|
| 4,005,411 | 1/1977 | Morrin, II | 358/135 |
| 4,200,886 | 4/1980 | Musmann et al. | 358/135 |
| 4,270,025 | 5/1981 | Alsup et al. | 358/135 |
| 4,369,463 | 1/1983 | Anastassiou | 382/56 |
| 4,420,771 | 12/1983 | Pirsch | 358/133 |
| 4,454,546 | 6/1984 | Mori | 358/260 |
| 4,563,671 | 1/1986 | Lim et al. | 382/56 |
| 4,578,704 | 3/1986 | Gharaui | 358/260 |
| 4,597,010 | 6/1986 | Carr | 358/135 |

Primary Examiner—Leo H. Boudreau
Attorney, Agent, or Firm—Sandler & Greenblum

[57] ABSTRACT

A data compression system for use in processing diagnostic image data which uses a predictor to predict future data. The actual data is subtracted from the predicted value to obtain data related difference values. The difference values are coded by coding the most prevalent difference by a code other than the least bit code but further coding the most prevalent number by string length coding, with the most common being the coded with a least bit code, and also coding the next most common difference with a least bit code and the subsequent most prevalent differences with sequential least bit codes to provide compression ratios of over 3:1. A procedure for finding the best predictor in noisy data is provided.

28 Claims, 7 Drawing Sheets

DATA COMPRESSION SYSTEM

FIELD OF THE INVENTION

This invention is an improvement over the invention of U.S. Pat. No. 4,654,877 issued on Mar. 31, 1987, and assigned to the assignee of this invention. As such this invention is also concerned mainly with imaging systems, wherein large amounts of data are acquired and processed to provide the final image and more particularly with systems and methods used for compressing, transferring and storing the image data and subsequently decompressing the image data with substantially no loss of accuracy. The contents of the noted U.S. patent are hereby incorporated herein and are sometimes referred to as the "invention of the basic application".

BACKGROUND OF THE INVENTION

The advent of modern computer systems spurred the development of imaging systems. Imaging systems are used in such diverse fields as military intelligence photography, astronomy, geology, agriculture and medical diagnostic imaging. This invention while finding utility in other and related imaging systems was particularly developed for that branch of diagnostic imaging generally known as digital fluorography. Although the following discussion of the background and the following description of the invention deal mainly with medical diagnostic imaging systems, the same problems occur in other systems with large amounts of data and therefore the invention is applicable to such systems, whether the data is arranged two-dimensionally or multi-dimensionally.

As computers progressed in speed and capacity so did the amounts of data used per image. Most images are arranged in rectangular (or even square) matrices and their size can be specified by their matrix dimensions. In medical imaging, for example, image size has grown from $32 \times 32$, fifteen years ago, to $512 \times 512$ or even $1024 \times 1024$ today. This thousandfold increase in data amounts is faster than the rate of decrease in the price of memories of all types, and data amounts keep growing. These vast amounts of data raise a number of problems.

In digital fluorography as in other branches of diagnostic imaging the data storage space and the time for transferring data to and from the temporary stores of the computer itself are critical factors in the imaging system's efficient operation.

For example the amount of data that can be stored in the random access memory (RAM) of the computer systems used is extremely limited. RAMs are expensive and therefore increasing the data capacity by increasing the capacity of the RAM is an expensive proposition. In addition with RAMs there is the ever present danger of losing data, since RAMs require power to maintain the data. This characteristic makes RAMs expensive to operate since they are drains on the power system.

Therefore imaging systems generally store the data on memory systems such as magnetic tapes or disks as soon as possible. Such memory systems hold more data than the RAM type memories and the retention does not require power. Among the drawbacks of such memory systems are that longer periods of time are required to on-load and off-load disks or tapes than to transfer data to and from RAMs. Also while the storage space in disks and tapes is much greater than that of RAMs, nonetheless such space is also limited.

Low resolution imaging systems are systems with low resolution requirements that can store data analogically. Such systems can usually store data directly as it is acquired. Slow imaging systems are systems with low speed requirements; that is they acquire data at a low rate. Such systems can usually store data directly as it is acquired, even digitally and thus do not need large internal RAMS. Fast, high resolution imaging systems either use very fast and very expensive disks or first acquire the data and store it in RAMs from which the data are transferred to the external memory, for example, for long term storage. The long time period required for on loading the disks makes it necessary to either use buffer memory devices or to use larger RAMs which as noted is expensive. Alternatively, continuing the data acquisition processes without storing all of the data results in exposing the patient to unnecessary radiation.

To increase the always limited storage capacity and to speed the transfer of data to and from the permanent storage systems, data compression and decompression systems have been used. Compression as used herein means transforming the data to reduce the size of the storage needed for the amount of data to be placed, either in the temporary, in the short term or in the long term stores. Decompression as used herein mean undoing the compression, that is transforming the compressed data received from the storage of reduced size to its original noncompressed form.

Storage size is measured by the total number of bits (binary digits) necessary to store the data in its current representation. The efficiency of compression can be measured by the ratio of the necessary storage size before compression to the necessary storage size after compression (compression ratio). For an example of systems of reducing the necessary storage size see U.S. Pat. No. 4,644,398 which issued on Feb. 17, 1987 entitled "Superinterlacing System" and is assigned to the assignee of this invention.

Other compression methods used in imaging systems in the past include circle cutting, delta modulation, Huffman codes, string length coding etc.

A short description follows of two prior art compression methods, to aid in obtaining a better understanding of this invention:

(a) "String length" coding replaces strings of identical values by the value followed by the length of the string (or the length and then the value). This is effective if the length needed to write the coded value is shorter than the length of the average string. For example, if information is usually coded in 4-bit units and the number zero appears in strings, the maximum length of which is 20,000; then 15 bits are needed to make sure that the number 20,000 can be written.

Where units of 4 bits are to be retained, then 4 units have to be reserved in the code for storing the string length. The total code is therefore 5 units of 4 bits. The code is efficient if the average string length is greater than 5. Every number can be thus coded, or only given ones, that are expected to come in long strings.

(b) "Replacement" coding (of which "Tree" codes and specifically the Huffman code are examples) replaces every number with a code value.

In general the more common a value is in the image, the shorter is its code value. The commonest values have code values shorter than the uncoded size, while the least common values have perforce, code values longer than the uncoded size.

The code is built using the statistics of the data i.e., the distribution of the data values, in such a way that the storage size needed for the code of the total image is less than the original storage size. This code is effective if built separately for each image, according to its specific statistics but loses effectiveness rapidly if the statistics change; e.g., if used for a different image with different statistics. A replacement code that is universally effective is virtually impossible, and a standard code that is used for a given range of statistics is usually not very efficient. We shall use the term "efficient replacement code" to denote a replacement code that uses the statistics to obtain a compression ratio that is optimal or close to optimal, as described above.

We shall use the term "quasi efficient replacement code" to denote a replacement code replacing the commonest value by a code value other than the shortest, i.e. by a code value longer than would be applied using an efficient replacement code, but otherwise following the general rule above.

Certain operations or mechanisms can be used to enhance the efficiency of compression. Consider, for example, the "difference" method. There, instead of looking at the values, one looks at the differences between the values in adjacent elements (pixels, if performed on an image). As the objects being imaged rarely change much within the resolution of the imaging equipment, these differences between the pixels are usually much smaller than the pixel values themselves. In many cases, such as in computerized tomography (CT), units of fewer bits may be used to store the differences than are needed for storing the original values (e.g. 8 instead of 12). However, noise reduces the efficiency of the method.

A variation of the difference method deals specifically with regions where there is no data. These regions may still contain noise. The knowledge that there is no data in those regions may be utilized to advantage.

For example, these no-data regions may be ignored; alternatively, they may be filled with a constant value to replace the noise, thus making all differences between neighboring elements equal zero. Where the actual image is a circle stored in a square matrix "circle cutting" or "circle blanking" are common examples of the use of such constant values.

A problem that has to be carefully treated when using data compression systems is the loss of accuracy that often occurs when operating on the data to compress it for storage and then to decompress it for use. Some compression methods take into account the fact that the data is accurate only to some limit by intentionally discarding information within the prescribed limit of accuracy. Any changes under that limit of accuracy are due mostly to noise and if real, are masked by, or blurred in the noise. The term "noise" here refers to random changes due to many causes, instigating inaccuracies in data values if taken separately. For example, count data, used in nuclear medicine, is accurate only to its own square root. That is, if the value measured is n, the "true" value has a probability P(m) of being m that is Gaussian, centered around n and spread with standard deviation equaling the square root of n; so that the probability of sampling (or measuring) the true value m instead of n is given by:

$$F(m) = \exp(-(m - n)^2/2n)/\sqrt{2\pi\, n}$$

If the count is 100 then the standard deviation is 10, therefore there is little information lost if the value 100 is stored as, say 99 or 101.

Some compression aids and enhancement methods, such as the "difference" method described above, are susceptible to noise, which reduces the efficiency of the method. However, any reduction of the aforementioned noise to increase the method's efficiency incurs the risk of information loss. Actually, compression methods allowing "information loss" may be very efficient, provided they sufficiently reduce the noise.

In the above nuclear medicine example, if the expected range of values is from 0 to 255 then 8-bit units are needed to store the data. The noise has a standard deviation in the range of 0–16 and there is 95% probability of the noise in a particular element being within 3 standard deviations. The average standard deviation of the noise in the image is the square root of the average value, or smaller than 16 by about a factor of the square root of two. Applying the difference method to the image implies doing subtractions. The subtraction operation increases the standard deviation by the same factor of the square root of two, making the average standard deviation of the noise in the differences equal 16. Therefore 95% of the differences would be in the range −48 to +48, even when there is no change in the object imaged. This range is the same as 0–96 and requires 7-bit units, which is no great gain over the original 8-bit unit storage. Smoothing this image, while theoretically causing some loss of information, does not adversely affect the image as to reliability of information (it may even improve detectability). At the same time, the smoothing by reducing the standard deviation of the noise by a factor of, say 3, brings the changes to a range that may be stored in 5-bit units, thus improving compression efficiency.

However, while information loss may be acceptable in many imaging fields, in the medical diagnostic imaging field the physicians object to any information loss. Also in some diagnostic imaging modalities such as in digital fluoroscopy noise levels are so low that not much is gained by noise reduction induced "information loss", unless of a specific nature, having other advantages.

The compression systems prior to that of the invention of the basic application do not provide compression rates in the range of 3 to 1 without a serious loss of accuracy when applied to, say digital fluorographic images with 512×512 matrices. There are several uses for such compression rates with digital fluorographic images having 512×512 matrices, for example.

Accordingly, at the time of the invention of the basic application there was a serious and pressing need for efficient data compression methods and systems for use in imaging systems. The invention of the basic application greatly improves on the prior art compression systems and methods and provides compression rates approaching the range of 3 to 1 without serious loss of accuracy.

According to a broad aspect of the invention of the basic application a compression method is provided which comprises the steps of: acquiring non-compressed data, to be compressed, obtaining difference data from the data to be compressed, finding a first distribution similar to the distribution of the difference data, obtaining first code values of the difference data using a first quasi efficient replacement code fitting said first distribution, obtaining second code values using a second code applied to specific data of said difference data, finding a second distribution similar to the distribution of said second code values, and obtaining said compressed data comprising third code values by operating on said second code values with a second quasi efficient replacement code fitting the second distribution, said compressed data further comprising non-specific difference data.

For many purposes still higher compression ratios are necessary. The present invention attempts to fill this need and to further approach the theoretical limits for no-loss compression (reversible compression).

BRIEF DESCRIPTION OF THE INVENTION

This invention is an improvement over the invention of the basic application. More particularly this invention adds a step of predicting future data and augments the step of obtaining difference data by finding the difference between the predicted data and the actual future data. The prediction of data is made by rules based on image type and values based on acquired data. The differences then between the predicted data and the actual data is substantially "noise". The predicted data however can easily be reconstructed based on the rules and the values already reconstructed whereas the noise follows no rule since it is "random". Thus by predicting the data, obtaining the difference between the actual data and the predicted data and then compressing the obtained difference the actual error or the noise is compressed. This system enables significantly improving on the invention of the basic application. Industry, and in particular the medical imaging industry, constantly requires and is seeking more efficient data compression methods and systems.

According to a broad aspect of the present invention data compression methods and systems are provided for use in compressing data to make more efficient use of memory space and to expedite storage of such data; said data compression methods comprise the steps of:
acquiring non-compressed data,
prediciting further non-compressed data,
obtaining the differences between the acquired non-compressed data and the predicted non-compressed data,
compressing the differences according to the compression method and systems of the basic application.
wherein the step of prediciting comprises:
determining the scan geometry for scanning the acquired data point by point,
choosing certain of the acquired data as basis data for each scanned point,
setting up a prediction formula using the values of the basis data to predict the value of the corresponding scanned point,
scanning the acquired data, and
applying the prediction formula at each scanned point.

In yet another feature of the invention the step of setting up a prediction formula comprises:
determining the noise level of the acquired data,
selecting a polynomial order based on the noise level,
determining a path of the closest approach to the next point to be scanned using the scan geometry,
obtaining values along the path,
interpolating the basis data, and
fitting the obtained values along the approach path to a polynomial of the selected order.

In an additional feature of the invention the step of setting up a predicition formula also comprises expanding the formula in terms of the basis data.

The actual compression method follows the compressing method described in the above referred to basic application. More particularly, the method includes the step of compressing the differences obtained with the predictor by using the following steps:
compressing the differences with a first replacement code arrangement, said first replacement code arrangement comprising a quasi-efficient replacement code,
further compressing the differences with an additional code arrangement selectively applied to specific values such as "string length"encoding, and
still further compressing the differences by compressing the further compressed differences resulting from the use of the additional code arrangement.

Further features of the invention include those of the invention of the basic application.

In general, it is a feature of the invention to select replacement codes for the most common difference values (the "basic" code) and replacement codes for the second most common difference values ("second code") so that the basic code is "effectively" the shortest code even though the basic code may actually be longer than the second code. The basic code is "effectively" the shortest code when the average coded number of bits representing each most common difference value is minimal and smaller than the average coded number of bits representing each second most common difference value. This is made possible by using the string length code for the commonest value in the data, which coding further compresses that part of the data made of the commonest value.

BRIEF DESCRIPTION OF THE DRAWINGS

The above mentioned and other features and objects of the invention will be best understood in the context of the following description of the invention made in conjunction with the accompanying drawings; in which.

GENERAL DESCRIPTION

Figure 1:
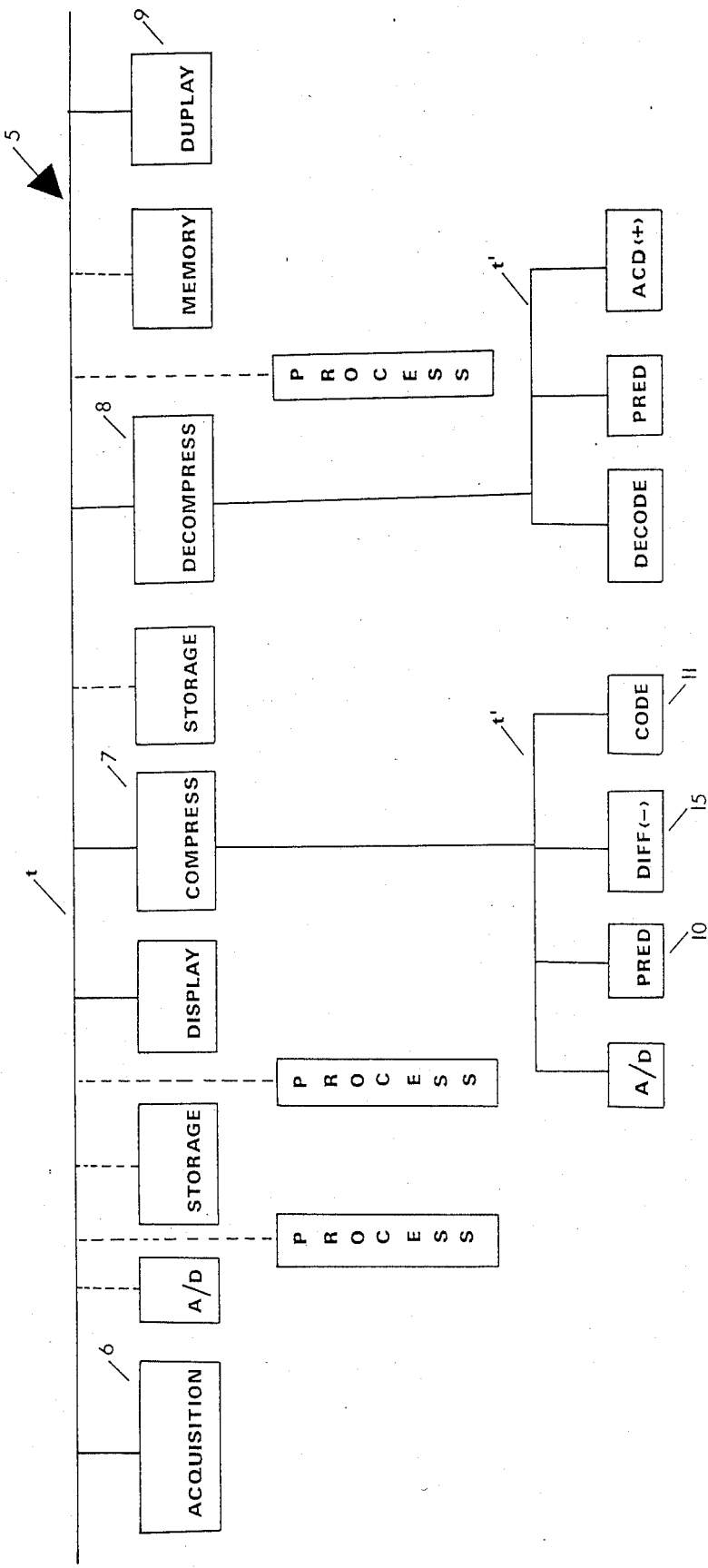
FIG. 1 is a time axis block diagram showing of a generalized inventive data compression/decompression system.

The time axis showing of FIG. 1 includes items or operations that are deemed to be required at particular times; shown as being connected to the solid horizontal time lines t and t' by solid vertical lines, and items or operations that are optional at particular times, shown connected to the time lines t and t' by dashed vertical lines. The data compression system 5 of the invention as shown in FIG. 1 includes acquisition means 6 for the acquisition of data; compression means 7 for the compression of the data; decompression means 8 for the expansion of the data and display equipment 9 to display the data.

The compression means of the present invention includes prediction means 10 for predicting future data. There are also difference means 15 for obtaining the difference between the actual acquired future data and the predicted future data. Means 11 are shown for coding the differences. In the example where the data is used for imaging, the type of imaging system will dictate if, when and where peripheral operations, such as noise suppression, filtering, analog to digital conversion, memory storage and data processing are performed. The block diagram of FIG. 1 basically indicates general portions of the inventive system.

Figure 2:
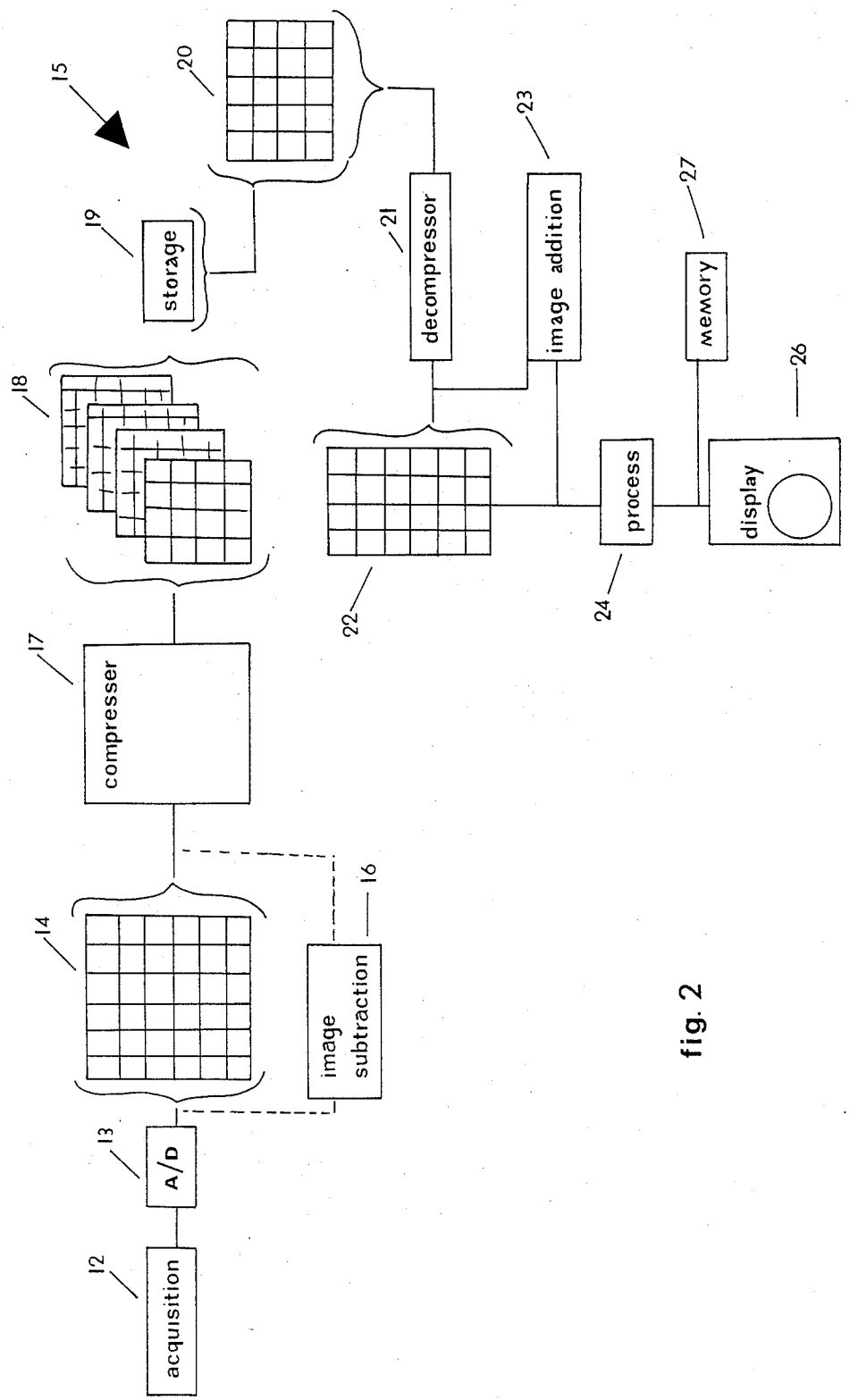
FIG. 2 is a block diagram showing of a particularized inventive data compression/decompression system.

The particularized imaging system 15 of FIG. 2 includes the necessary acquistion means 12 for acquiring image data. The acquisition means typically acquires analog data which as shown is converted to digital data by analog to digital (A/D) converter 13. The digital output of the A/D unit is either operated on directly for image enhancement purposes or stored in available short term storage facilities such as in a RAM associated with the computer (not shown). The data is typically stored in matrices of elements of data arranged in rows and columns, such as depicted by matrix 14 which represents an arrangement of matrices. The data can be written into the matrices at a relatively fast rate. However, as mentioned hereinbefore, the random access memories are relatively expensive and limited. Certain operations are preferably carried out prior to the compression —especially operations which themselves reduce the quantity of data. For example, the image subtraction operation of digital flurorgraphy may be performed prior to the data compression. As shown in FIG. 2 the image subtraction means 16 is coupled either prior to or after storage in data matrix arrangement 14, but prior to data compression unit 17. It should be realized, however, that the image subtraction system is not necessary to the invention. In fact, image subtraction while reducing the quantity of data enlarges the noise relative to the information. Thus its effects on compression are not always beneficial.

Another possible operation is noise reduction in areas with no data. For example, TV cameras, gamma cameras, tomography recontsructors etc; produce round images; any part of the (square) matrix outside this circle has no useful data and the values therein can be disregarded or replaced by a constant value which is selected to increase the compression ratio. Other areas known to have no useful data content can be similarly treated.

The compression unit 17 uniquely compresses the data stored in matrix arrangement 14 in an optimal manner so that the total quantity of data per image is minimized without causing any ambiguities in the expansion procedures that are implemented prior to operating on the data. Thus in digital fluorographic systems having images with 512×512 matrices and in nuclear medicine imaging systems (e.g. gamma cameras) having images with 128×128 or 64×64 matrices, compression ratios consistently, in the order of at least 3 to 1 are obtained using this invention without any loss of accuracy.

Once again it is emphasized as shown in FIG. 1 that within the scope of the invention compression can occur at any point in the data processing, for example before storage, after storage, in parallel to storage or without storage. As shown in the compression-decompression system 15 of FIG. 2 the compressed data from compression unit 17 may be temporarily stored in smaller matrices, such as in matrix arrangement 18, which represents the compressed data for an image. The compressed data, in any event, is shown as being written into the long term external storage means such as storage 19 representing disk or magnetic tape means.

Since the compressed data has approximately one-third as many digits as the uncompressed data it takes approximately one-third of the time to write the compressed data onto the external storage means 19. It should be also apparent that approximately only a third of the storage space is required for the compressed data.

Of at least equal importance is the fact that since the data can be fed into the permanent storage in less time, the RAM can be read-out in a shorter time. Therefore, a smaller RAM memory is required for temporary or buffer storage in the inventive system for the same amount of data. Alternatively longer runs of data can be acquired before filling the same buffer.

When processing of the data is required either for evaluation purposes, for enhancement purposes or for display purposes, then it is necessary to expand or decompress the compressed data. The decompression is substantially accomplished by decompressor 21 which obtains the compressed data from storage 19. The output of the decompressor 21 is the uncompressed data which may be arranged in rows and columns of data elements such as shown in matrix 22, which represents an arrangement of matrices. The decompressor expands the data by the inverse of the compression ratio to return the data in matrix 22 to its original form, i.e. that of matrix arrangement 14.

For cases wherein image enhancement was accomplished by subtraction, such as by image subtraction unit 16, an image addition unit 23 is attached either prior to or after matrix 22 so that the processor 24 may be provided with the original unsubtracted image data. The image addition unit 23 like the image subtraction unit are not key elements of the invention but are optional as far as this invention is concerned.

The processor 24 shown in FIG. 2 is a display processor whose output is either the display image shown on display unit 26 or an image stored in memory unit 27.

Figure 3:
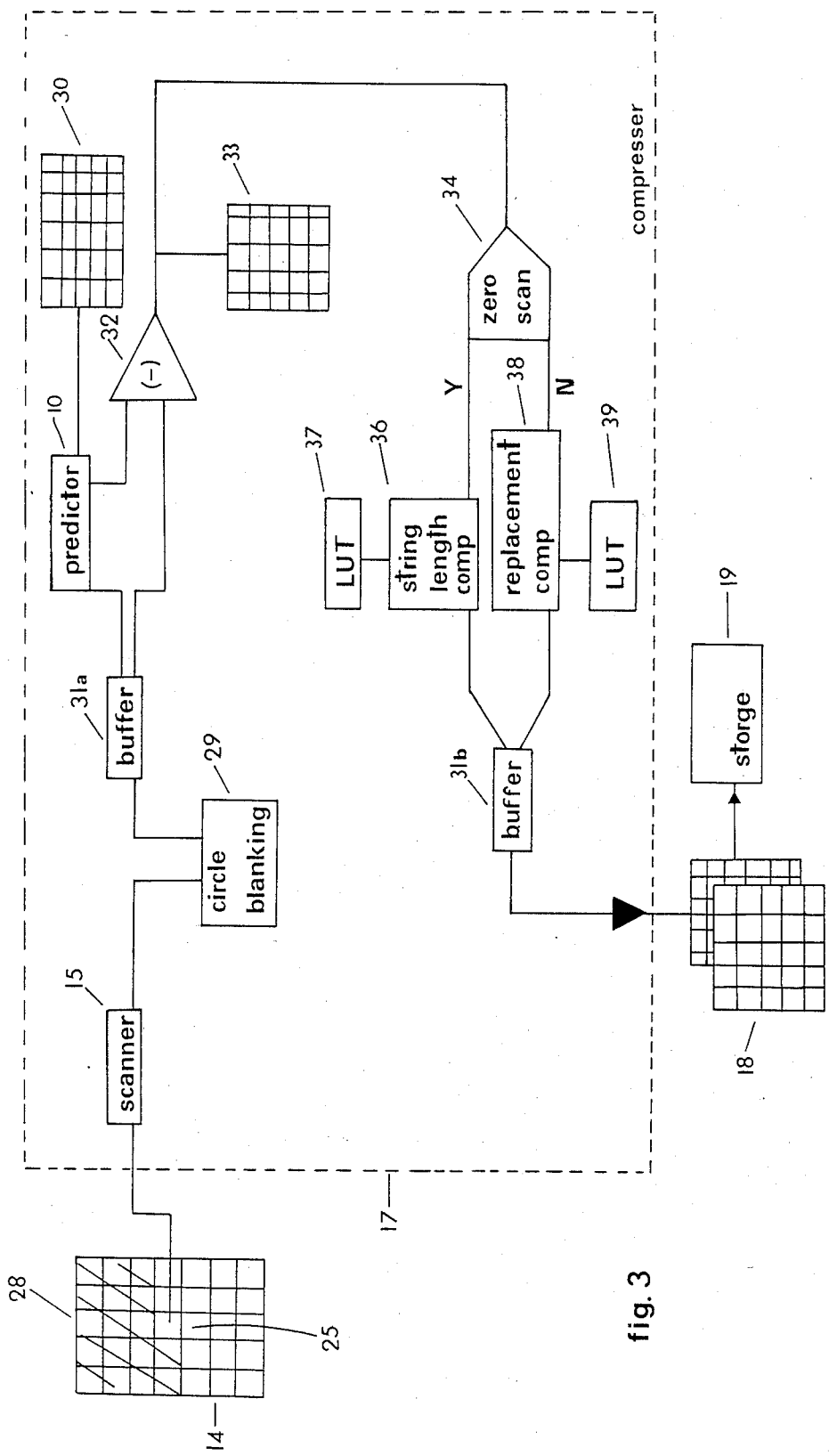
FIG. 3 and 4 are block diagram showing details of the data compressor and decompressor of FIG. 2.

The details of the compressor as shown in FIG. 3 are much narrower than this invention. Among other things, the step of obtaining the differences between the acquired data and the predicted data can be accomplished in many different ways even for the particularized system of FIG. 2. For example:

(a) prediction and subtraction can be done on the analog signal prior to a log transformation step (not shown), (b) prediction and subtraction can be accomplished after log transformation, on either analog or digitized data.

(c) prediction and subtraction can be done "on-the-fly" with either no intermediate storage, or in parallel to storage;

(d) prediction and subtraction can be done "on-the-fly" prior to storage (here, the difference data is stored);

(e) prediction and subtraction can be performed on stored data in an intermediate memory, simultaneously with the acquisition of more data into different parts of the memory; and (f) predication and subtraction can be performed on stored data after acquisition has been completed.

FIG. 3 shows an exemplary compressor using the invention. Although the output may be analog or digital signals directly from the front end (acquisition means) in the example system of FIG. 3 the compressor uses data stored in memory 14 in a matrix form.

This data may be either raw data or data after image subtraction, and may have had noise limiting operations done on it (filtering, circle blanking) or not.

The compressor 17, as shown in FIG. 3 includes a scanner 15 which reads the memory 14 pixel by pixel according to a predetermined order, say line by line from top to bottom and each line from left to right. At each given instant there is a pixel 25 which is currently processed for compression and a group of pixels 28 (and their values) which have already been processed for compression.

Before the data is further compressed some noise limiting operation may be performed on it, such as circle blanking, if those have not been done earlier. These are done by, say, circle blanking unit 29, which substitutes a selected value into the region outside the circle defined in a DF system by the field of view of the TV camera.

The data compressor 17, as shown in FIG. 3 includes a buffer unit 31a. The buffer unit, preferably a "First In, First Out" (FIFO) type buffer may be required to compensate for the relatively large difference in the time needed to code and handle data of different values or types such as strings, long code values, short code values, etc. At the same time as data flows in at a steady rate the buffer 31a transmits the data on a first-in first-out basis upon demand. Such as for example when the further parts of the circuits have finished processing the previous pixel and are ready to process the current one. A second FIFO buffer 31b controls data storage so that on a first-in-first-out basis the data which exits the compressor at an uneven rate is stored in storage unit 19 at a different rate.

The first of the FIFO buffers 31a may be omitted if in all cases the compression means is fast enough to respond prior to the arrival of the next piece of data. The second buffer 31b may be omitted if a large enough buffer exists in the storage means.

According to the invention predictor means 10 are provided for predicting future data based on part of the acquired data which is stored in matrix arrangement 14. The predicted data may be stored in matrix arrangement 30, for example. As indicated the predicted data and the original data are operated on by subtraction unit 32 which calculates the difference between the value in the current pixel 25 of the matrix arrangement 14 as transmitted directly and the value predicted of the same pixel by the predictor. The differences are shown as being read into difference matrix arrangement 33, for example. The above differences in a preferred embodiment are scanned for the most common difference value.

In any case where subtraction is performed such as in image subtraction or as the subtraction done by unit 32 in the embodiment of FIG. 3, the distribution is essentially symmetrical around zero. If the noise level is not too great and if the prediction is good enough, the most common value is 0 (zero). So the differences are scanned for zeros by the "0" scan unit 34.

There are methods well known to people versed in this art for creating "efficient" codes, when the distribution of values in the data to be compressed is known. These codes, as explained above, have code values that are generally shorter the more common the value. Thus they utilize the distribution to advantage. As a rule, the better the predictor—the narrower the distribution and therefore, the more effective a replacement code can be for compression.

However, in the inventive method, as explained in describing the invention of the basic application, a "quasi-efficient" replacement code is used. That is, the next to the most numerous difference, is provided with the shortest code value; the subsequent most numerous difference number is provided with the next shortest code value etc. This may be implemented by way of look-up tables. Thus, the non-zero differences are compressed by compressor 38 operating in conjunction with means such as look-up table (LUT) 39 (or dedicated circuit 39, or computer program 39 etc.) to compress the data.

The compressed data may be written into a matrix arrangement 18. Preferably the compressed data is transferred directly into storage unit 19, where it is retained until needed again.

According to the invention a code value is chosen to indicate zero, the most common value. This code value is not the shortest possible code value but is a unique non-ambiguous code that is the shortest "effective" code. The most effective code can be determined as follows:

Define the probability of the occurence of zero as P1, and its code length as b1. Its "effective" code length when following the disclosed inventive system is: b1×K, where K is the compression factor achieved by string-length coding the zeros. Actually, string-length coding is used only if it yields K<1, i.e. it compresses the average strings.

The 2nd and 3rd most common differences are d2, d3; (on both sides of zero, usually +1 and −1) their probabilities are P2 and P3, respectively (with P2=P3, assuming a symmetrical probability curve such as a Gaussian, which is a fair assumption, considering that the sum of negative differences equals the sum of positive differences, as outside the circle we have a constant value.)

Their code lengths are b2 and b3 respectively, with b2=b3. The total length TL of the code for values 0, d2 and d3 after compression is:

$$TL = P1 \times b1 \times K + 2 \times P2 \times b2$$

If the code is switched between zero and d2 the total length for the codes of the same values becomes TL', where:

$$TL' = P1 \times b2 \times K + P2(b1 + b2)$$

and the difference in total lengths is:

$$TL' - TL = (P1 \times K - P2) \times (b2 - b1)$$

The second total lengths TL' is longer than the first total length TL even where b2<b1 (the code length of the most common difference is greater than the code length of the second most common difference) whenever $P1 \times K < P2$. The most "effective" code, i.e. the shortest total length is thus surprisingly not the one with the shortest code length for the commonest value. The same considerations apply to b4, +b5. (Note that b1 should be longer than b4 if $P1 \times K < P4$. However, while for DF images $P1 \times K$ is usually smaller than P2, it is usually not smaller than P4.)

The system through the "zero" scan unit 34 recognizes and counts "strings" of zeros i.e. sequentially occurring zeros. A replacement code is constructed for the string lengths according to their distribution, which is either previously known, assumed or measured.

This code is "efficient", that is the most common string length is given the shortest possible code value, with the next most common string length having the next shortest code value, etc. This code may also be implemented by a look-up table (LUT). Improving the predictor yields a higher probability P1 for obtaining the difference value 0. At the same time it also increases the probability that a zero shall follow another zero, thus increasing the average string length. This in turn, increases the efficiency of string-length coding and decreases the value of the string-length compression ratio for zeros K. It is difficult to estimate the change in $(P1 \times K - P2)$ but the considerations are similar to those in the invention of the basic application.

The preferred embodiments of the "zero" string-length coder 36 is described in the basic application, together with look-up table 37 (or dedicated circuit 37 or computer program 37)

Note that these units are examples only. The use of other string length codes and other replacement codes are also covered by the invention, and can be used if $P1 \times K < P2$.

Note that although theoretically more optimal codes are possible, such as by unifying the distribution tables of the values and the string lengths, this method has been shown to be equally efficient to the optimal code in several cases and is always at least very close to optimal. The advantage of the inventive method lies in the fact that by always preceding a zero string by the code value for zero it is easy to decompress the data. The decompressing means can check for the code value of zero and send the data to the appropriate decompressor either for non-zero values or for strings of zero values. This enables using either electronic circuits or computer programs doing the decompression in real time, just as the compression can be performed in real time (real time herein means at the rate at which the data is acquired).

The compressed data is retained in storage unit 19 until called up for processing such as for image enhancement by filtering and/or for display.

Figure 4:
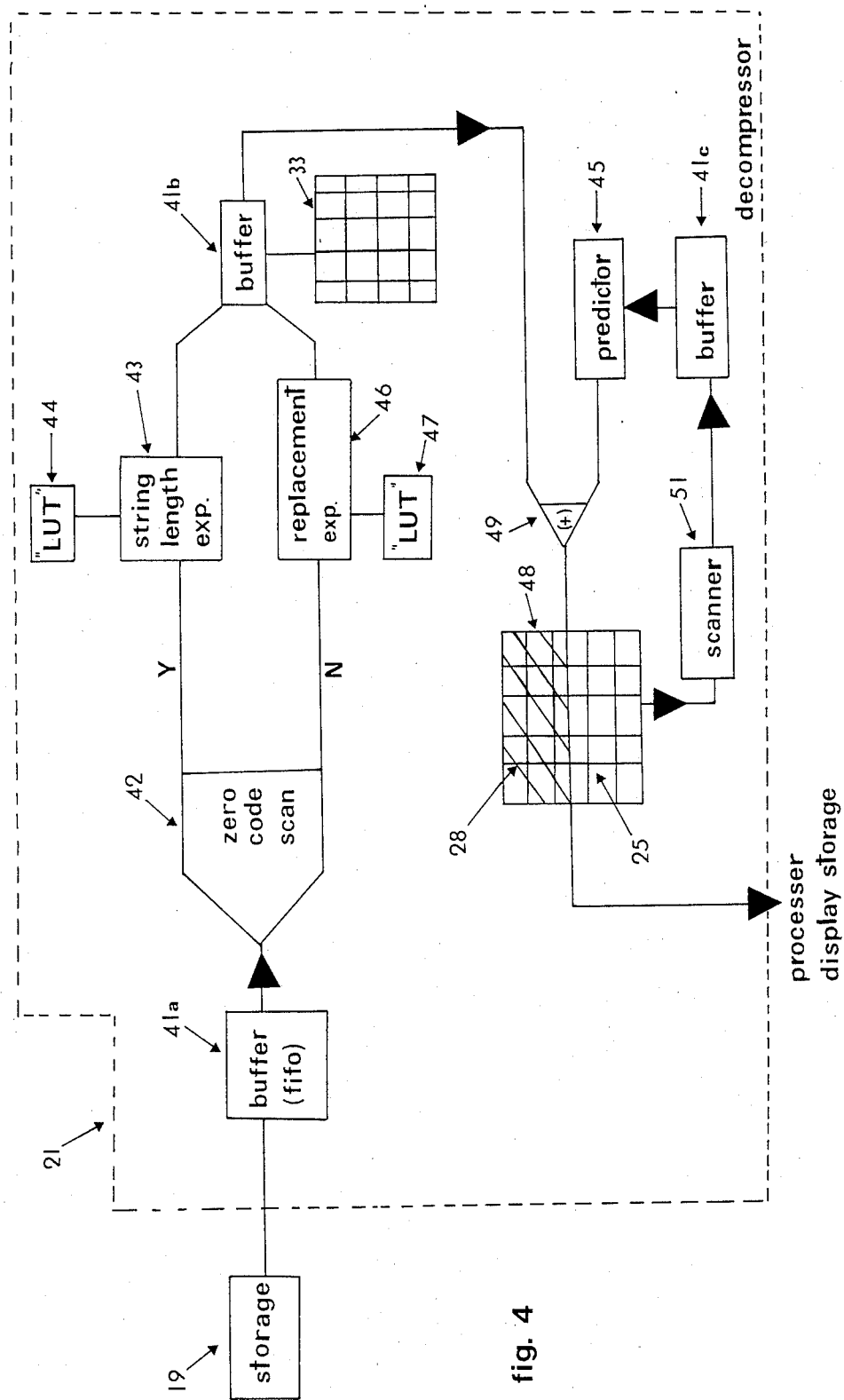

The data is expanded or decompressed prior to being processed. Details of the decompressor system 21 are indicated in FIG. 4. Therein the compressed data is shown as being transferred to a buffer unit 41a which is indicated as being a FIFO unit. The type of the buffer unit is not critical to the invention, though. All that is desired at this point is a means for compensating for the differences in the time required to read the data out of storage means 19 as compared to the time required to process the data by expansion.

The data in the buffer 41a is scanned by unit 42 to search for the code value for zero, thus differentiating codes for zero strings from other data. The zero strings are decompressed using the decompression unit 43 and data translator means 44 (preferably an LUT but not necessarily) which translate the zero string length from the stored codes. Similarly the other data is decompressed using the decompression unit 46 operating in conjunction with data translator means 47 (preferably an LUT, but not necessarily). The data translator means 44 and 47 may be look-up tables, dedicated circuits, or computer programs, etc.

The outputs of decompression units 43 and 46 are fed into buffer 41b, whose purpose is to compensate for the different expansion rates of the two expanders. It may be omitted if all units are fast enough to cause no mixing of the order of the data. The decompressed data is added, in adder unit 49, to the predicted data arriving from predictor 45 for the same pixel, and placed in the correct pixel 25 of matrix 48. Matrix 48 is shown as divided into a region 28 where decompressed data has already been placed and having a pixel 25 which is being currently processed for decompression.

Scanner unit 51, buffer memory 41c and predictor unit 45 may be identical to scanner unit 15, buffer memory 31a and predictor unit 10 of the compressor as shown in FIG. 3. As the predictor unit 10 is constrained to use only data in region 28 of matrix arrangement 14 (during compression) or matrix arrangement 48 (during decompression and region 28 already contains processed data, the predicted result is identical in both cases. Thus, by adding the difference data stored by the compressor, the adder 49 creates the exact values of the original data which was shown as matrix arrangement 14 in FIG. 3.

Thus, the combined action of the compression of FIG. 3 and the decompression of FIG. 4 is to transmit the exact original data while storing it in the interim using a much reduced storage capacity.

The improvement of this present invention over the invention of the basic application hinges, among other things, on the predictor which while providing the same values for inverse processes, yields even in noisy data a better approximation than that used by the basic application, resulting in a higher compression ratio.

The efficiency of the compression depends on the configuration entropy of the compressed data, which generally is a monotonic function of the width (for example, the FWHM) of the distribution, for a unimaximal distribution. This width is affected in so far as predictor errors are concerned by a combination of two factors, the ideal predictor error and the predictor noise.

The predictor operation is based on the values of certain points, called hereinafter the "basis" points. As in a general image the autocorrelation function is a decreasing function with increasing distance. The closer these basis points are to the "target" (the pixel currently being processed), the higher the correlation and the better the ideal prediction can be. In addition, the values in the ideal image follow some rule which can be approximated by a polynomial for example. In general one might think that the higher the polynomial order is, the better it approximates the image "change rate" and therefore the better the prediction. However, as higher order polynomials need more basis points, the additional powers are based on points with lower correlation with the target value and thus any correlation due to a higher order is diminished. Therefore, polynomials of even fairly low orders usually are nearly as efficient as high ordered ones.

In addition, the data is never ideal, rather it contains inaccuracies which, if random or unpredicatable, are called "noise". Polynomial prediction uses extrapolation and is based on differentials. These tend to amplify the noise. The higher the order of the polynomial, the larger the noise amplification, reducing the effectiveness of the compression. Combining the increasing and the decreasing effects on polynomial prediction with changing order causes a certain polynomial order to be most effective. This order depends on the initial noise level, and in DF images of 512×512 or 256×256 pixels and Nuclear Medicine images of 64×64 or 32×32 pixels it was found that the most effective order is "0" or "1".

Predictors do not have to be based on polynomials, other functions, such as trigomometric, elliptic and other functions can be used. However the considerations mentioned above will lead to the conclusion that the functions with the slowest rate of variation are best for the type of images under discussion.

To be used in a compression system, a predictor must be based on values at points, all of which have already been processed. This may reduce its effectiveness by ruling out the use of highly correlated data which has not been processed, but it insures that the decompression provides the correct and exact original data. Since in this compression system it is basically the prediction errors that are compressed and stored; therefore in the decompression stage the prediction errors are restored. These must now be added to the predicted values in order to reconstruct the original values, and this is possible only if the predictor is based on data that has already been processed. Thus, if the data is processed in the same order during compression and decompression, then the data on which the prediction is based (the values at the basis points) is available when needed.

The term "scanning geometry" is herein used to describe the exact order in which the data points are processed. A raster scan is an example of the scanning geometry.

To properly use the predictor the compression system must operate in an orderly fashion (such as compress pixels in a raster scan fashion). Thus, for example, all points that have already been compressed form a contiguous part of the image and each new point is at the periphery of the contiguous part of the image. A multiplicity of paths through the contigious part to the new point are selected.

There are many ways to build and/or describe predictors. The following method provides an example:

When processing an unprocessed point which lies on the border of the contiguous region of points already processed, paths are drawn leading to the unprocessed new point. Along a path a series of points are selected and numbered sequentially with the one point furthest from the new point being assigned the number one. A path is called approaching if the distance between the new point and the selected points decreases with increasing sequential numbers. The distance may be measured along the path. It is simpler, but not necessary, to select points whose distances are multiples of a certain quantum. To have a system that is not data dependent, there is no apriori reason to use any but straight paths, (and no reason to prefer them), but for simplicity's sake assume straight line paths. According to the above discussion, the use of paths which allow using points which are closer to the new point is preferred.

The data along the chosen approach path is fitted to a function of the selected type, say a polynomial of the selected order. Since the selected points along the path do not always coincide with actual points as represented by, say, pixel centers, the values at the selected points are interpolated (using any interpolation method, say, linear) from the values at the pixel centers (basis points) around them. Thus, any approach path defines its set of basis points, which are used for interpolating the values at the path points. All the basis points must be such as have already been processed for compression. Also, the larger the number of basis points, the less noisy are the interpolated values, and thus the less noisy the predicted value and the higher the compression ratio.

Figure 5:
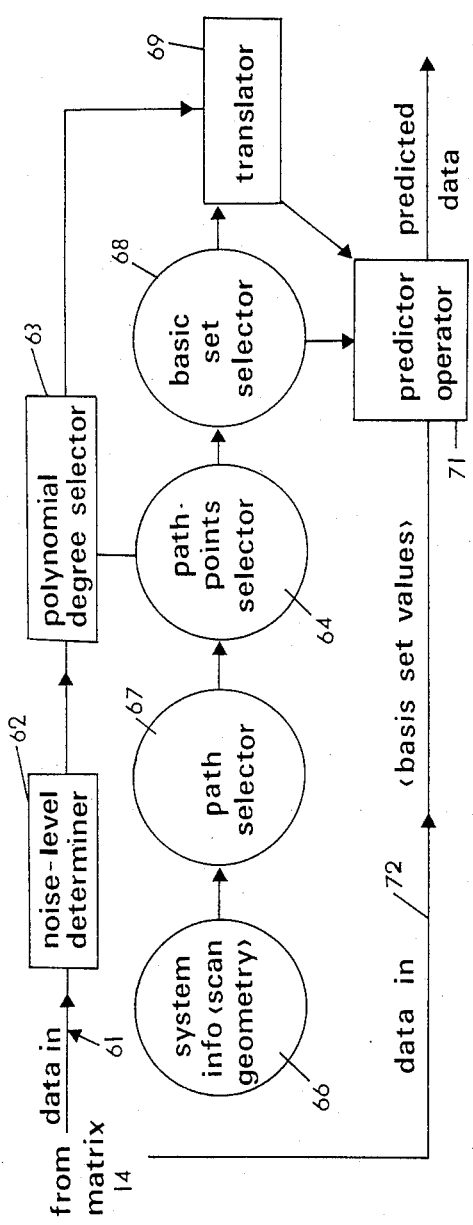
FIG. 5 is a flow-type block diagram showing of details of the predictor used for predicting further data.

The diagram of FIG. 5 indicates in block form, a system for predicting the future data. More particularly the incoming data is first transmitted through a line 61 for analysis in unit 62, to determine the noise level. The determined noise level is used by selector 63 to select the order of the polynomial to be used for the prediction.

The polynomial order N is fed into path point selector 64. At the same time, a prior knowledge about the system, such as the scan geometry 66 is used by path selector 67 to select a path through the data. The selected path is combined in path point selector 64 with the selected polynomial order to select N+1 path points (say, at regular intervals from the point C which is currently being processed) along the selected path. With the path selected a basis set selector 68 then selects the basis set of points, which are the pixel centers which provide the values of the set points by interpolation, for example. The values at the pixel centers are known.

Note that the basis set is a relative set, moving with the point to be processed.

The polynomial is translated by unit 69 into an operator which obtains the prediction polynomial results by using the values at the basis set points. This operator is loaded into predictor unit 71. The data from matrix arrangement 14 which provides the values of the basis set points is now fed via line 72 to the predictor operator unit 71 which implements the prediction and provides predicted data. This may be better understood in light of the following examples.

Figure 6:
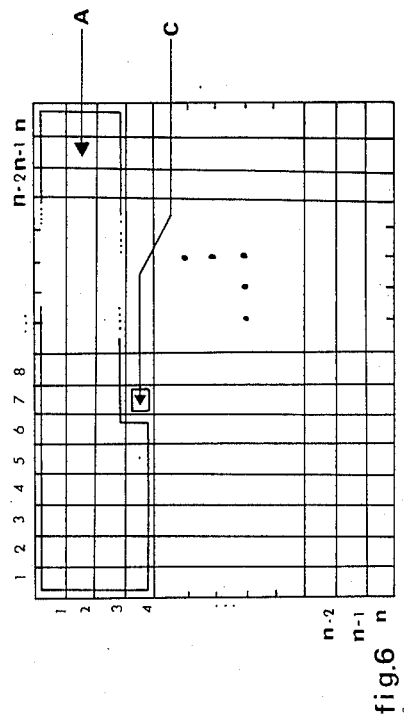
FIG. 6 is a showing of a matrix being scanned for prediction purposes.

FIG. 6 shows the division of a square n×n matrix scanned with a TV raster scan geometry (line after line, from left to right). The pixel C currently being processed is shown on this matrix along with the contiguous group of pixels already processed {A}. This group in this example contains all pixels in lines above the current pixel's line and all pixels to the left of C.

Figure 7:
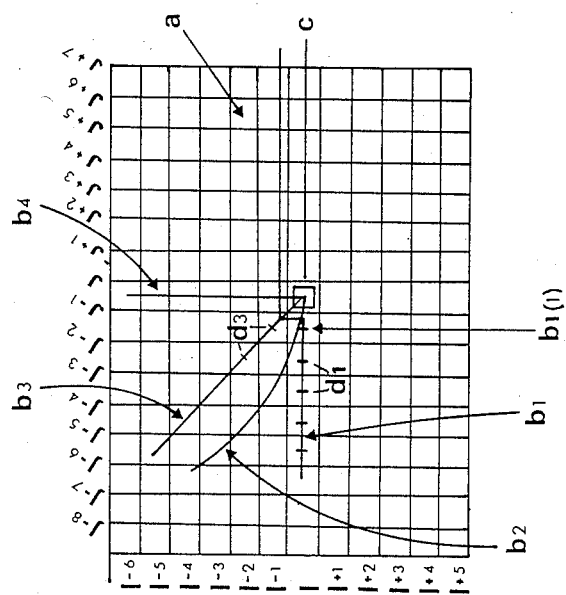
FIG. 7 is a showing of further details of the matrix being scanned.

FIG. 7 shows the neighborhood of the pixel C currently being processed, with part of the region {A} of the pixels already processed. Pixel C is situated at line I, column J and other pixels are marked relative to it. Also shown are four sample approach paths, b1 . . . b4. Path b1 has marked on it equidistant points, at multiples of a quantum distance d1, from the center of the pixel C. Path b3 has marked on it equidistant points, at multiples of a smaller quantum distance d3 from the center of C. Path b2 is curved while the others are straight. According to the criteria set forth above, approach path b3 is preferrable to approach path b1, because the path points on b3 are closer to C than the path points on b1. It is not possible to calculate the value of a point on b1 closer to C than the point marked b1(1) using interpolation between values of pixels in {A} (assuming values represent pixel centers).

Figure 8:
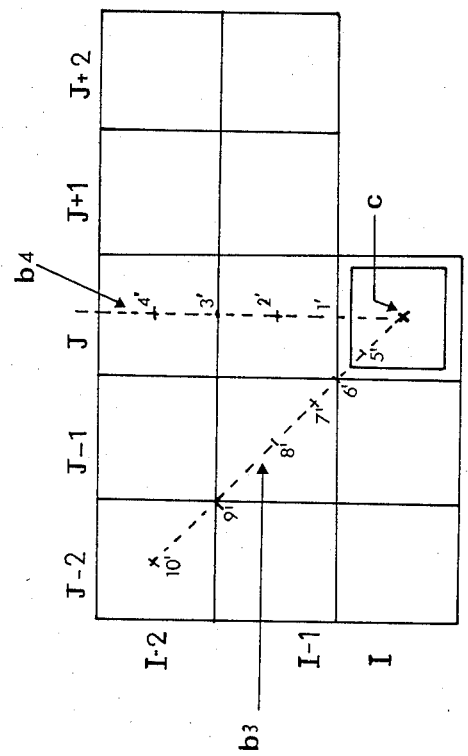
FIG. 8 is a close up of the vicinity of the pixel currently being scanned to further explain the operation of the predictor.

FIG. 8 shows a closer view of the vicinity of the pixel C. Two paths are shown, b3 and b4, with points marked along them. Different sets of equidistant path points may be selected even along one path. For example, The points 2' and 4' along path b4, are set at integer multiples of the pixel distance d where d is the distance between pixel centers of adjacent pixels. The points 1', 2' and 3' along path b4 are set at distances of ½d, and 3/2d from C. The path with points 1', 2' and 3' (or 1' and 2') is better than path with points 2 and 4. Along example path b3, points 5', 7' and 8' which are e/3, 2e/3 and e away from C, (where e is d times the square root of 2 and equals the diagonal pixel distance) form a better set of path points than set 8 and 10 which are at integer multiples of e away from C.

The values of the path points at the above cited points can be obtained by interpolation, for example:

$$v(5) = \tfrac{1}{2}v(I,J-1) + \tfrac{1}{2}v(I,J+1)$$

$$v(7) = \tfrac{1}{2}v(I,J-1) + \tfrac{1}{2}v(I-2,J)$$

$$v(8) = v(I-1,J-1)$$

where v denotes the value.

Thus, the basis set for path points 5,7 and 8 is $$\{(I,J-1),(I-1,J+1),(I-,J-1)(I-2,J)\}$$

In another example, the points 6 and 8 also form a path points set, the values are given by $$v(6) = \tfrac{1}{2}v(I,J-1) + \tfrac{1}{2}v(I-1,J)$$

$$v(8) = v(I-1,J-1)$$

and the basis set is $\{(I-1,J),(I-1,J-1),(I,J-1)\}$.

Often different path point sets provide practically equally attractive paths for setting up the predictor and a choice has to be made between path sets. For example, the constant distance in the first example set (points 5,7,8) is smaller than the second example set (points 6,8); Also, the basis set is larger ( 4 points vs. 3). On the other hand, the interpolation distances are larger (the end points are further from the middle, interpolated point) in the first set (e times the square root of 5 in the first set; e times the square root of 2 in the second). Also the basis set of the first example includes more distant points (such as (I-2,J)) and does not include closer points (such as (I-1,J)). Thus, there are 2 points in favor of each set, which makes them about equally good. If two path points are sufficient (the polynomial order selected is 1 or 0) then the second example set proves simpler. If more points are needed, the second example set cannot be considered.

There are several ways to chose between paths and therefore basis sets when the different paths appear a priori to be similarly effective. One example method is based on contour following: Iso contours in real images are usually slowly varying (in direction). Thus, among several paths, the one with the smallest data slope is the path closest to an isocontour and is the path to be selected. A second example method is based on the fact that if a path crosses from one object to another in the image, the fit of the polynomial will not be a very good one. Therefore, when faced with a choice between several paths, select the one whose polynomial fit has the smallest variance.

Both the slope and the variance can be translated into operators on the basis set. For example, where the slope of the linear polynomial, fit by the least squares best fit method to points 5, 7 and 8 in FIG. 8, is $(v(5)-v(81))/2$, which is translated to $(2v(I,J-1)+v(I-1,J+1)-3v(I-1,J-1))/6$; provides a predicted value of C; $v(c)=(4v(5)+v(7)-2v(8))/3$ which is translated to $v(c)=(10v(I,J-1)+4v(I-1,J+1)+v(I-2,J)-6v(I-1,J-1))/9$.

At the same time the variance of the fit is given by $Var=(2v(7)-v(5)-v(8))/6$, which is translated to $Var=(2v(I,J-1)+2v(I-2,J)-v(I-1,J+1)-3v(I-1,J-1))/54$. The variance can be used to determine which path sets to use.

Figure 9:
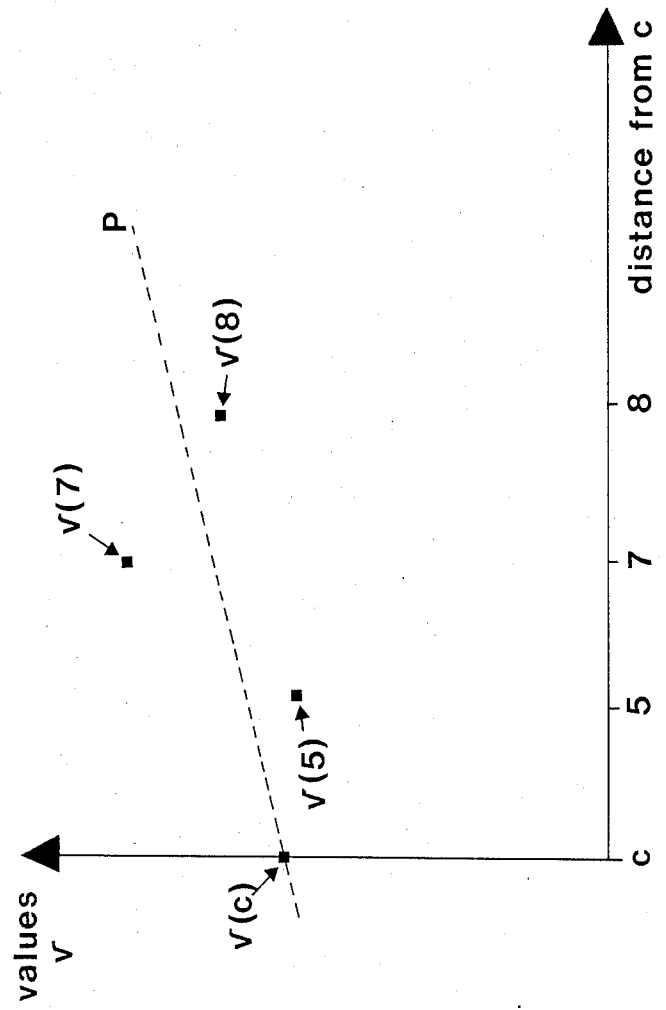
FIG. 9 is a cross section of data along the path b3 in FIG. 8.

FIG. 9, shows the application of a predictor as applied to FIG. 8. Therein a graph of values versus distance from C is shown. the path points v(5), v(7) and v(8) are plotted on the graph. A polynomial P is fit to the points. The intersection of the polynomial to the ordinate axis provides the predicted value of the pixel C.

The prediction errors are compressed as described in the above mentioned basic application, for example. However, note that as raw data images are less noisy than mask subtracted data (by a factor of the square root of 2, if the mask is one of a set of images). The method described here yields generally higher compression ratios for raw data images than for subtracted images, and in both cases better than those of the above cited basic application.

The question of whether raw images or subtracted ones are used is however, outside the scope of the instant invention, which works with any image.

In order to build simpler systems, all the steps of noise-level prediction, polynomial selection, path selection, basis set selection and definition of predictor can be done for a general type of data, such as DF images. While this slightly reduces the compression effectiveness, as measured by the compression ratio, it reduces the number of decisions that the system has to make during operation, thereby simplifying the system.

Note that in any case, the predictor used in the decompression stage must be identical (same basis set, same operator) as the one used in the compression stage.

By combining and varying previously disclosed data processing schemes, a new viable efficient data compresion system is provided.

While the invention has been described in connection with certain embodiments it must be recognized that this description is by way of example only and not as any limitation on the scope of the invention which is defined by the following claims.

What is claimed is:

1. A data compression method for compressing acquired image data to make more efficient use of memory space and to expedite the transfer of said data; said method comprising the steps of:

aquiring image data, using a scan geometry for scanning the aquired image data region by region in an orderly fashion to obtain at least some of the data to be compressed, said scan geometry being determined by the image data aquisition system used for aquiring the image data, predicting further data to be compressed based on the scanned aquired image data to obtain predicted data, obtaining difference data from differences between said predicted further data and further aquired data, compressing the difference data by encoding the difference data to be compressed using a string length code arrangment for the most prevalent difference data, encoding the second most prevalent data to be compressed with a replacement code that is the shortest, encoding the sequentially next most prevalent difference data with the shortest replacement code not previously used, the step of predicting further data comprising the steps of:

using the scan geometry used for scanning the aquired image data to scan only data regions that have not previously been scanned and are contiguous to scanned data regions, choosing a path from available paths from all of the contiguous scanned data regions that terminate in the region being scanned for predicting purposes, selecting path points on said chosen path that come closer to the center point of the region being scanned that path points of any other available path, determining the values of the selected path points, and determining the predicted value of the region being scanned using the determined values of the selected path points.

2. A data compression method for use with the data compression method of claim 1 said decompression method comprising the steps of:

recalling some of the data to be decompressed, decompressing said recalled data, predicting further data to be decompressed based on the decompressed recalled data, wherein the predicting step is identical to said predicting step of the compression method, recalling further data to be decompressed, using an inverse string-length code arrangement and an inverse efficient replacement code arrangement based on said recalled further data to obtain a difference data set and the size of said difference data set, and adding said difference data set to a corresponding set of predicted further data, said set of predicted further data being the same size as said difference data set, to enable obtaining a set of further decompressed data.

3. The method of claim 2 wherein the second code comprises using the string length step of scanning the difference data to find strings of a specific value, determining the lengths of said strings and replacing said strings by a combination of said string lengths and said specific value.

4. The method of claim 3 wherein the string length code is an efficient replacement code of the string lengths.

5. The method of claim 2 including the step of suppressing noise in no data regions of the difference data to be compressed.

6. The method of claim 5 including the step of obtaining differences of the data to be compressed after the said suppressing of the noise.

7. The method of claim 5 wherein, the difference data to be compressed is digitized and stored in matrix elements and wherein the step of suppressing noise includes assigning data values to the no data matrix elements.

8. The method of claim 2 including the step of using look-up tables to obtain coded values.

9. The method of claim 2 including the step of programming said codes to obtain coded values.

10. The method of claim 2 including the step of using dedicated circuitry to supply said coded values.

11. The method of claim 1 wherein the step of determining the value of the region being scanned comprises extrapolating the value of the region being scanned from the determined values of the path points.

12. The method of claim 1 wherein the step of determining the value of the region being scanned comprises setting up a prediction formula using the values of the path points in the prediction formula to obtain the value of the region being scanned.

13. The method of claim 12 wherein the method of setting up the prediction formula comprises the steps of: determining the noise level of the acquired data, and selecting a polynomial order based on the noise level.

14. The method of claim 13 wherein the step of determining the value of the selected path points comprises:

interpolating the values of the selected path points using the values of basis points, said basis points being the known values of center points of said scanned data regions.

15. An image data compression system for compressing image data to make more efficient use of memory space and to expedite the transfer of said image data said system comprising:

acquisition means for acquiring image data to be compressed, means for predicting the data to be acquired, means for obtaining difference values between the acquired data and the predicted data, means for encoding the difference values using string-length coding for the most prevalent difference values, means for encoding the second most prevalent difference value to be compressed using a shortest replacement code, means for encoding each sequentially next most prevalent difference values using the shortest replacement code not previously used;

said means for predicting comprising:

means for predicting data values only for regions that have not previously been scanned and are contiguous to scanned data regions, means for choosing a path from available paths from all of said contiguous scanned data regions, said path terminating in a region being scanned, means for specifying path points on said path, said path points coming closest to the center point of the region being scanned than path points on any other available path, means for determining the values of the specified path points from the data of the previously scanned regions, and means for predicting the value of the region being scanned from the determined values of the specified path points.

16. A data decompression system for use with the system of claim 15 said system comprising:

means for recalling some of the data to be decompressed, means for decompressing said recalled data, means for predicting further data to be decompressed based on the already decompressed recalled data, means for using an inverse efficient replacement code and an inverse string-length code based on the recalled further data, means further for using said used codes to obtain a difference data set and the size of said difference data set, and means for adding said difference data set to a corresponding set of predicted further data, said set of predicted further data being of the same size as said difference set to enable obtaining a set of further decompressed data.

17. The system of claim 15 wherein the means for obtaining the inverse string-length coded values comprises means for scanning the data to determine strings of a specific value and the lengths of the strings, and means for replacing said strings with a combination of said specific value and said string lengths.

18. The system of claim 17 wherein the said specific value is the most prevelant value.

19. The system of claim 18 including means for suppressing noise in no data regions of the data to be compressed.

20. The system of claim 19 including means for obtaining differences operated subsequent to the operation of the means for suppressing of noise.

21. The system of claim 19, including means for digitizing the data to be compressed, means for storing said digitized data in matrix elements, and wherein the means for suppressing noise includes means for assigning data values to the no data elements of said matrix.

22. The system of claim 15 including look-up tables to obtain coded values.

23. The system of claim 15 including means for programming said codes to obtain coded values.

24. The system of claim 15 including dedicated circuitry to supply said coded values.

25. The system of claim 15 wherein the means predicting the value of the region being scanned comprises means for extrapolating the value of the region being scanned from the determined values of the path points.

26. The system of claim 15 wherein the means for predicting the value of the region being scanned comprises:

computation means using the values of the path points in a prediction formula to obtain the predicted values of the region being scanned.

27. The system of claim 26 including means for setting up the prediction formula comprising:

means for selecting a polynomial order of said formula based on the noise level of the system.

28. The system of claim 27 wherein the means for determining the value of the selected path points comprises:

means for interpolating the value of the selected path points using the values of basis points, said basis points being the known values of the regions of center points of said scanned acquired data.

* * * * *